United States Patent [19]

Labat

[11] 4,033,437
[45] July 5, 1977

[54] SYNCHRONIZER WITH ROCKING KEY DISENGAGEMENT

[75] Inventor: Pierre Labat, Chatillon, France

[73] Assignee: Societe Anonyme de Vehicules Industriels et d'Equipements Mecaniques (SAVIEM), France

[22] Filed: Mar. 10, 1976

[21] Appl. No.: 665,366

[30] Foreign Application Priority Data

Mar. 19, 1975 France .............................. 75.08618

[52] U.S. Cl. .............................. 192/53 F; 192/53 E
[51] Int. Cl.² ......................................... F16D 23/06
[58] Field of Search ........... 192/53 E, 53 F; 74/339

[56] References Cited

UNITED STATES PATENTS

| 2,399,569 | 4/1946 | Peterson et al. | 192/53 E |
| 2,412,208 | 12/1946 | Dence | 192/53 F |
| 2,417,566 | 3/1947 | Polomski | 192/53 F |
| 3,804,218 | 4/1974 | Krutashov | 192/53 E |
| 3,980,164 | 9/1976 | Labat et al. | 192/53 E |

FOREIGN PATENTS OR APPLICATIONS

| 1,402,451 | 8/1975 | United Kingdom | 192/53 F |

*Primary Examiner*—Samuel Scott
*Assistant Examiner*—Lance W. Chandler

*Attorney, Agent, or Firm*—Beveridge, De Grandi, Kline & Lunsford

[57] ABSTRACT

A synchronizing and dog coupling device for a motor vehicle gearbox in which there are two pinions arranged to be coupled selectively to a drive shaft of the gearbox comprises a coupling ring which is engaged through a driving collar for rotation with the drive shaft and which has a plurality of radial bars, a double synchronizer ring having conical friction surfaces for co-operation selectively with friction surfaces on said pinions, and locking surfaces on said synchronizer ring and said coupling ring bars co-operable to prevent engagement of said coupling ring bars with dog teeth on one or other of said pinions until the speeds of said coupling ring and said pinion are synchronized, the synchronizer ring being braced by a set of rocking keys each of which is located in an axial groove in the driving collar and is arranged to rock on a radially outwardly biassed thruster, each key having first and second sloping sided transverse notches for co-operation respectively with the coupling ring and the thruster so that when the coupling ring is moved to uncouple it from one of the pinions the rocking keys move to re-center the second notches on the thrusters and thereby disengage the friction surfaces of the synchronizer ring and the pinion.

3 Claims, 8 Drawing Figures

SYNCHRONIZER WITH ROCKING KEY DISENGAGEMENT

This invention relates to a motor vehicle gearbox of the kind which has a pair of pinions for selective coupling to a driving shaft of the gearbox, each pinion having a set of dog teeth and a conical friction surface under the dog teeth, and particularly relates to a device for synchronizing and coupling either pinion to the driving shaft, the device comprising a driving collar which is arranged to be engaged with the driving shaft for rotation therewith, a coupling ring which has a number of radial bars and which is mounted on the driving collar so that it rotates with the driving collar but is moveable axially along it to engage the bars with the dog teeth of one or other of the pinions, a double synchronizer ring which has a pair of conical friction surfaces and which is moveable by the coupling ring selectively to engage one of its friction surfaces with the friction surface of one of the pinions, and locking surfaces on the synchronizer ring and on the bars of the coupling ring which are arranged to engage with each other to prevent further axial movement of the coupling ring to engage the bars with the dog teeth on the pinion until the speeds of the coupling ring and the pinion are synchronized.

The two parts of the double synchronizer ring are fixed together, and to prevent unnecessary contact between the friction surfaces of the synchronizer ring and the pinions, it is known to provide an auxiliary thrusting device which co-operates with the faces of the coupling ring and with the functional parts of the synchronizer ring. These functional parts, be they sloping surfaces, guide bearings or shoulders, make it necessary to machine the synchronizer ring, and consequently it is not possible to use synchronizer rings in the raw state, that is to say without verifying their dimensions.

In order to ensure that the synchronizer ring centers itself automatically it must have steeply sloping surfaces, and as a result the coupling ring is difficult to construct because the sizes necessary for the openings between the bars reduce the thickness of the hub of the coupling ring. Consequently, the resistance of the coupling ring to the stresses applied in transmitting torques consecutively to the two pinions is reduced.

The aim of the present invention is to avoid these difficulties, and according to the invention the double synchronizer ring of a synchronizing and coupling device of the kind described is braced by a set of rocking keys each of which is located in an axial groove in the driving collar and is arranged to rock on a radially outwardly biased thrust member, each key having a first transverse notch with sloping sides near the middle of its radially outer face for co-operation with the coupling ring and a second notch with sloping sides near the middle of its radially inner face for co-operation with the thrust member so that when the coupling ring is moved to uncouple it from one of the pinions the rocking keys move to re-center the second notches on the thrust member. The action of the thrust members and the rocking keys when the coupling ring is moved to disengage it from a pinion serves to re-center the synchronizing ring and thereby disengage the friction surfaces of the synchronizer ring and the pinion independently of the axial position of the coupling ring.

Preferably the rocking keys are equally spaced around the periphery of the driving collar and each key has a wing portion at each end which is arranged to co-operate with a shoulder on the synchronizer ring to limit the rocking angle of the key.

An example of a device in accordance with the invention will now be described with reference to the accompanying drawings, in which.

Figure 1:
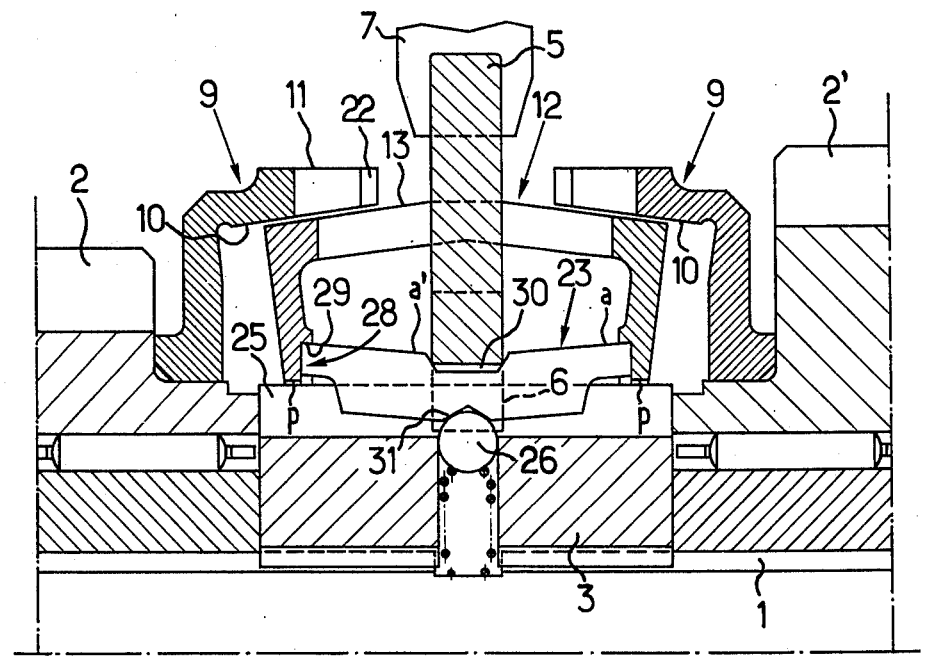
FIG. 1 is a radial section through the device when fitted in a gearbox.

FIG. 1 shows a driving shaft 1 of a gearbox, and two pinions 2, 2' which are arranged to rotate freely on the driving shaft 1 when the coupling device in accordance with the invention is disengaged as shown. The pinions 2 and 2' cannot shift axially along the driving shaft 1.

Fixed to the driving shaft 1 by splines is a driving collar 3 which has axial grooves 4 spaced regularly around its periphery, and with which a coupling ring 5 is engaged by means of inwardly directed teeth 6 which fit in the axial grooves 4. The coupling ring 5 therefore rotates with the driving collar and the driving shaft, but can slide axially along the driving collar 3 under the action of a fork 7. The coupling ring 5 has a number of radial bars 8 which have locking side surfaces 8a, 8b, and each pinion 2, 2' has a friction-cone dog 9 which has a number of dog teeth 11 and an internal conical friction surface 10 under the teeth 11. The number of dog teeth 11 on each dog 9 is equal to the number of bars 8 on the coupling ring 5, but if desired may be a multiple of the number of bars 8.

On the driving collar 3 there is mounted to slide axially a double synchronizer ring 12 which has two outer conical friction surfaces 13 corresponding with the internal friction surfaces 10 of the dogs 9. The double synchronizer ring 12 slides axially on the outer surface of the driving collar 3 with the help of bearing surfaces $p$, which slide on the peripheral surfaces of the teeth of the driving collar 3. The synchronizer ring 12 is also able to rotate through a limited angle relative to the driving collar 3 and hence also the coupling ring 5.

Figure 3:
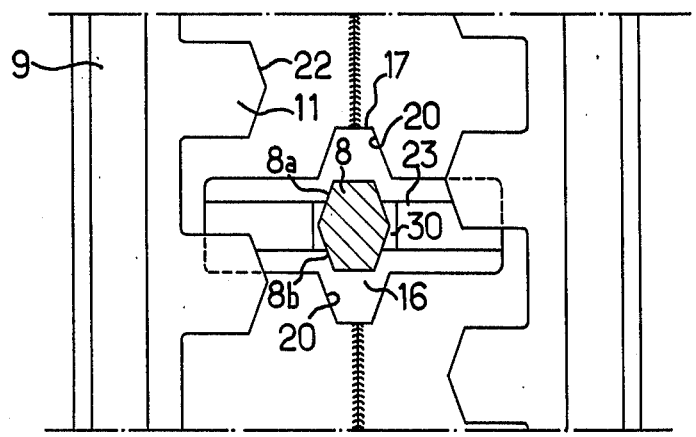
FIG. 3 is an external plan view of part of the device with the components in positions occupied in FIG. 1 and with the outer portion of the coupling ring removed for clarity.
Figure 2:
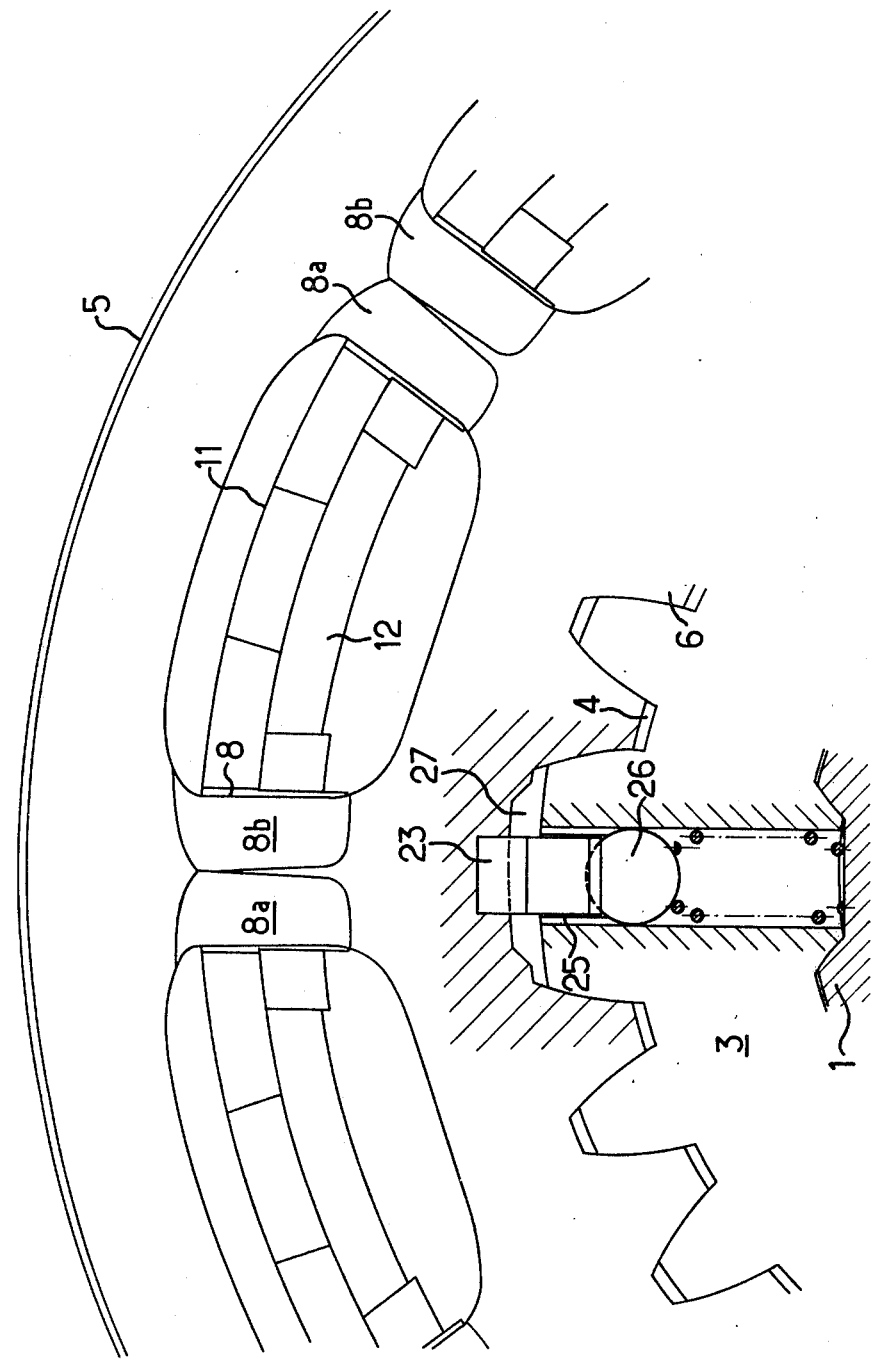
FIG. 2 is an elevation of a portion of the coupling ring of the device, partly in section to illustrate details of the invention.
Figure 4:
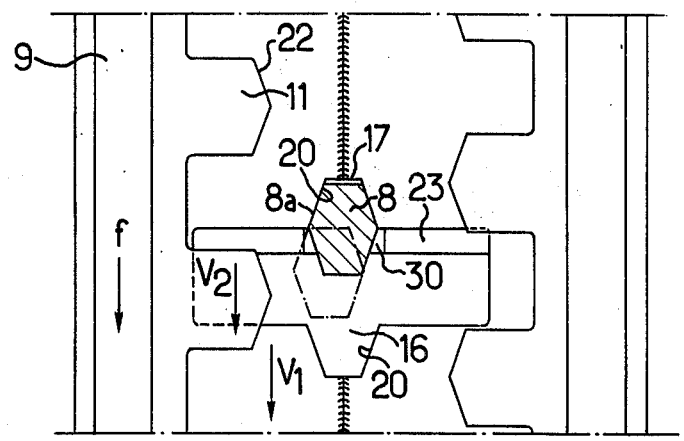
FIGS. 4 and 5 are views similar to FIG. 3 but showing the positions of components during different stages of operation.

The movements of the double synchronizer ring 12 relative to the coupling ring 5 are limited, as shown in FIG. 3, by the bars 8 of the coupling ring 5 which project through openings or slots 16 in the synchronizer ring 12, one bar 8 through each slot 16. Each slot 16 has a shape such that when the synchronizer ring 12 is in a certain position relative to the coupling ring 5 the corresponding bar 8 engages in a locking portion of the slot 16, as shown in FIG. 4. Each slot 16 has locking surfaces 20 which correspond with the locking surfaces 8a, 8b of the bar 8.

The double synchronizer ring 12 is braced, that is to say influenced in its position, by a set of rocking keys 23 which are equally spaced around the periphery of the driving collar 3 and are located in axial grooves 25 in the driving collar. Each key 23 is arranged to rock on a thruster 26 which, in this example, comprises a ball which is biased in a radially outward direction by a compression spring housed in a bore in the collar 3. The inner walls 28 of the double synchronizer ring 12, that is to say the walls facing the coupling ring 5, have shoulders 29 which co-operate with the ends of the wings a, a' of the rocking keys 23 so as to limit the rocking angle of each key on its thruster 26.

The coupling ring 5 straddles each rocking key 23, and has for this purpose the requisite number of recesses 27, which is preferably at least three, spaced at equal angles around its inner periphery. The center portion of each key 23 has in its radially outer face a sloping sided transverse notch 30, and in its radially inner face a sloping sided transverse notch 31. These two notches 30 and 31 are arranged so that when the device is in a dead center position as shown in FIGS. 1 and 3, the coupling ring 5 is seated in each notch 30 in engagement with its sloping sides, and the rocking keys 23 are centered over the thrusters 26 with the balls of the thrusters seated between the sloping sides of the notches 31. In this position, the double synchronizer ring 12 is centered and neither of the conical friction surfaces 13 of the synchronizer ring 12 is in contact with a conical friction surface 10 of the dogs 9.

Figure 6:
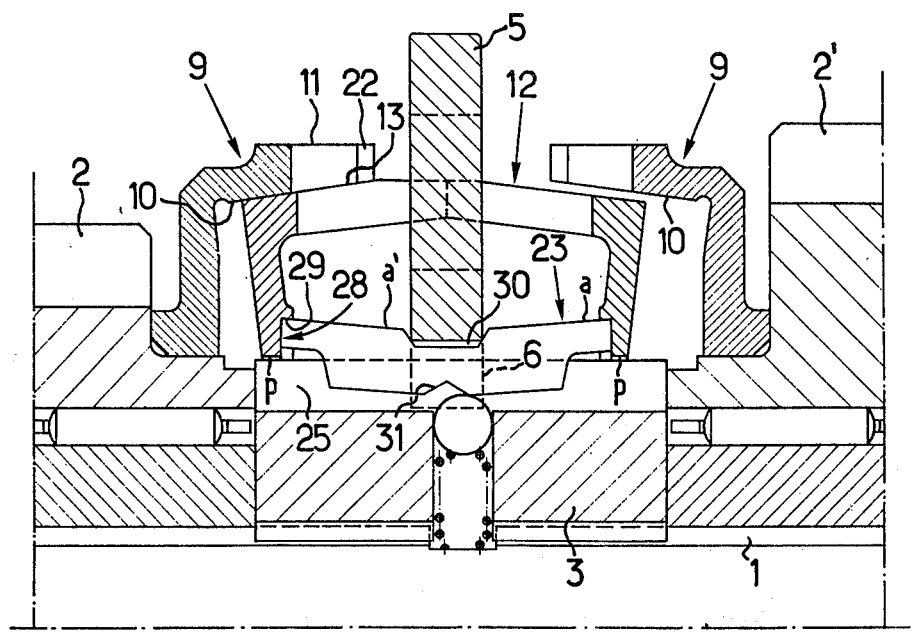
FIGS. 6 and 7 are views similar to FIG. 1, but showing the device in the stages of operation represented in FIGS. 4 and 5 respectively.

The functioning of the device for synchronizing the engagement of the bars 8 of the coupling ring 5 with the dog-teeth 11 of one of the dogs 9 is as follows. In FIGS. 4 and 6 it is assumed that the operator of the vehicle wishes to engage the driving shaft 1 with the pinion 2. For this purpose he causes the coupling ring 5 to move towards the left, in the known way. The coupling ring 5 thrusts axially against the left hand sloping edge of the notch 30 of each rocking key, and the right hand sloping edges of the notches 31 slightly depress the balls of the thrusters 26 against the influence of the springs as the keys 23 are shifted to the left to engage one of the friction surfaces 13 of the ring 12 with the friction surface 10 of the dog 9 of the pinion 2.

Let it be assumed that the double synchronizer ring 12 is being driven at a rotational speed VI, drive being transmitted to the ring 12 from the driving shaft 1 through the driving collar 3, and the coupling ring 5. The pinion 2 is assumed to be rotating at a speed V2, and the direction of rotation of the pinion 2 relative to the driving shaft 1 is indicated at f in FIG. 4. Because of the difference between V1 and V2, engagement of the friction surfaces 13 and 10 causes the double synchronizer ring 12 to rotate through a limited angle relative to the coupling ring 5 until the bars 8 of the coupling ring locate in the slots 16 and the locking surfaces 8a engage with the locking surfaces 20.

The device is now "armed", that is to say the coupling ring 5 cannot advance further towards the pinion 2 relative to the synchronizer ring 12, because the locking surfaces 8a of the bars 8 are up against the locking surfaces 20 of the synchronizer ring 12, these surfaces having the same slope, as is conventional. As shown in FIGS. 4 and 6, the speed difference between V1 and V2 finally brings each bar 8 as far as it can go towards limiting surface 17 forming the bottom of the corresponding slot 16 in the periphery of the synchronizer ring 12. As in every locking synchronizer, the coupling ring cannot advance towards the pinion 2 as long as there is a difference between the two speeds V1 and V2.

The synchronizer ring 12 is applied to the conical surface 10 by a force which is a function of the resistance to rocking of the keys 23.

Figure 5:
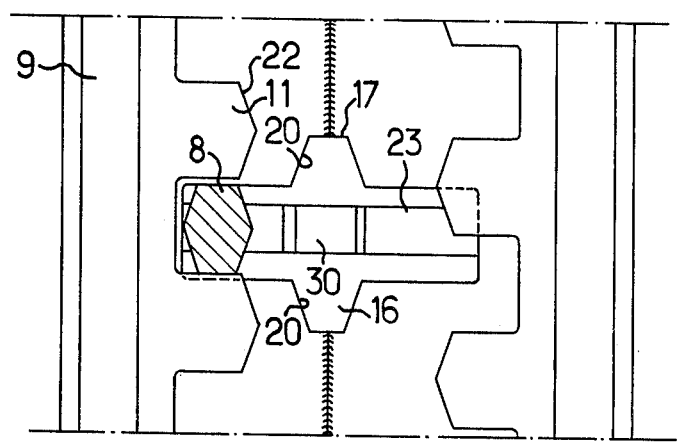

Complete synchronization is obtained in the known way. As mentioned above, the slope of the locking surfaces 8a and 20 is such that the torque resulting from friction between the engaging conical surfaces 10 and 13 prevents relative axial movement between the locking surfaces 8a and 20, and consequently the coupling ring 5 cannot advance towards the pinion 2 as long as the speeds V1 and V2 remain different. When the friction torque has decreased to zero and further axial movement of the coupling ring is no longer prevented, the synchronizer becomes unlocked in the known way by rotation of the double synchronizer ring 12 relative to the coupling ring 5 in the direction opposite to that represented by the arrow f (FIG. 4). This brings each bar 8 into the position shown in chain lines in FIG. 4, relative to the synchronizer ring 12, and the coupling ring 5 is now able to advance towards the pinion 2, the bars 8 entering between and engaging with the dog-teeth 11 as shown in FIG. 5. This movement is facilitated by chamfered ends 22 on the dog-teeth 11 having a slope corresponding to the slope of the surfaces 8a and 8b of the bars 8.

Figure 7:
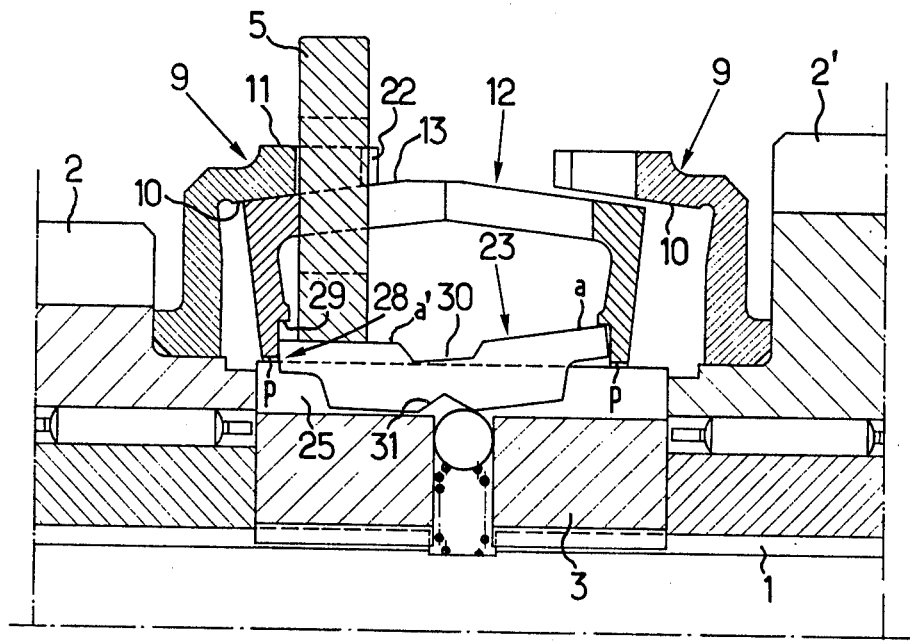

It will be observed from FIG. 7 that under these circumstances each rocking key 23 has rocked freely in response to the thrust applied by the axially moved coupling ring 5, without its wing a' leaving the internal side wall of the synchronizer ring. The other wing a remains in contact with the shoulder 29.

Figure 8:
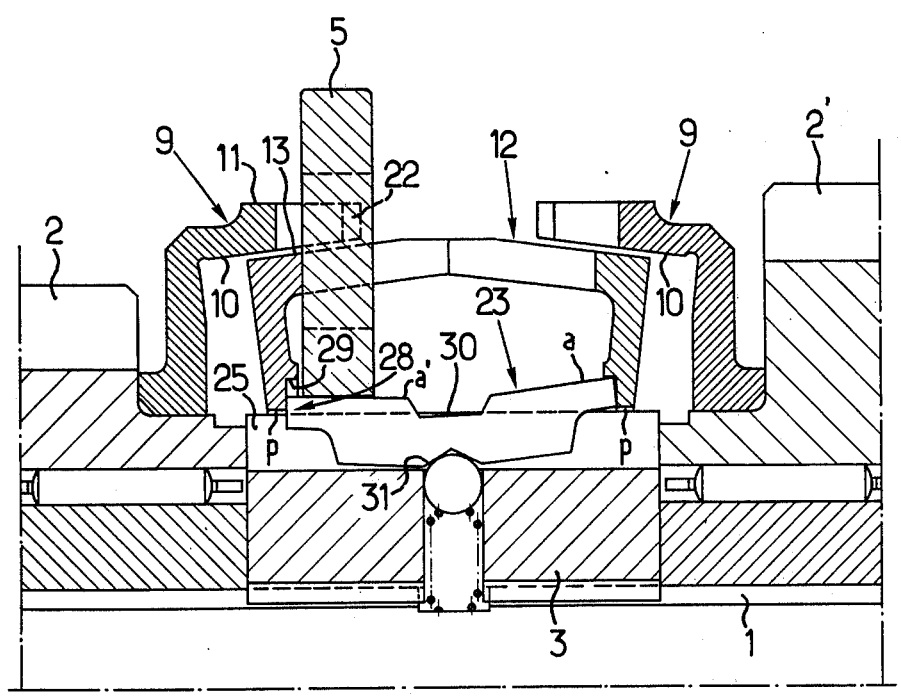
FIG. 8 is a further view similar to FIG. 1, but showing the device in a further operational stage and illustrating the function of the invention.

Disengagement of the dog-coupling proceeds as follows. The coupling ring 5 is moved by the fork 7 towards the right as shown in FIG. 8, and this allows the energy previously stored in depressing the thrusters 26 to be recovered. The action of each thruster 26 on the right hand sloping edge of the corresponding notch 31 causes the rocking keys 23 to shift towards the right until the notches 31 are re-centered on the thrusters. This movement of the rocking keys 23, relative to the coupling ring 25 also shifts the position of the synchronizer ring 12 axially to the right, disengaging the conical friction surfaces 10, 13 as soon as the coupling ring is moved towards the right. As can be seen, the thrusters 26 return the keys 23 and the synchronizer ring 12 to their central, stable positions (as represented in FIGS. 1 and 3) well before the coupling ring 5 has fully disengaged from the dog teeth 11 and returned to its own center position.

Consequently the device prevents contact between the friction cones during disengagement of the coupling ring.

I claim:

1. In a synchronizing and coupling device for a motor vehicle gearbox of the kind including a drive shaft and two pinions for selective coupling to said drive shaft, a set of dog teeth on each pinion, and a conical friction surface on each pinion under said dog teeth, said device comprising a driving collar adapted for driving engagement with said drive shaft, a coupling ring, a plurality of radial bars on said coupling ring, means mounting said coupling ring on said driving collar for rotation therewith and axial movement therealong to engage said bars with said dog teeth of either of said pinions, a double synchronizer ring, a pair of conical friction surfaces on said double synchronizer ring, means mounting said double synchronizer ring for movement by said coupling ring selectively to engage one of said friction surfaces on said synchronizer ring with the friction surface of one of said pinions, locking surfaces on said synchronizer ring and on said bars of said coupling ring co-operable to prevent further axial movement of said coupling ring to engage said bars with said dog teeth on said pinion until the speeds of said coupling ring and said pinions are synchronized, the improvement wherein said device further comprises a plurality of rocking keys bracing said double synchronizer ring, means defining a plurality of axial grooves in said driving collar, each of said grooves receiving and locating one of said rocking keys, a plurality of radial thrusters in said grooves and on which said rocking keys are adapted to rock, radially inner and outer faces of each of said rocking keys, first notch means near the middle of said outer face of each rocking key, sloping sides to said first notch for co-operation with said coupling ring, second notch means near the middle of said inner face of each rocking key, and sloping sides to said second notch for co-operation with said thruster whereby when said coupling is moved to uncouple it from one of said pinions said rocking keys move to re-center said second notches on said thrusters and thereby disengage said friction surfaces. of said synchronizer ring and said pinions.

2. A device as claimed in claim 1, wherein said rocking keys in said locating grooves are equally spaced around the periphery of said driving collar, and wherein each of said rocking keys has a wing portion at each end and said double synchronizer ring has shoulders for engagement by said wing portions of said rocking keys to limit the rocking angle of said keys.

3. In a motor vehicle gearbox of the kind including a drive shaft, two pinions for selective coupling to said drive shaft, dog teeth and a conical friction surface on each of said pinions, a driving collar driven by said drive shaft, a coupling ring, a plurality of radial bars on said coupling ring, means mounting said coupling ring on said driving collar for rotation therewith and axial movement therealong to engage said bars with said dog teeth of either of said pinions, a double synchronizer ring for preventing engagement of said coupling ring bars with said dog teeth of said pinions until the speeds of said pinion and said coupling ring are synchronized, a pair of conical friction surfaces on said synchronizer ring for co-operation selectively with said friction surfaces of said pinions, and locking surfaces on said synchronizer ring and said bars of said coupling ring which engage each other when one of said friction surfaces of said synchronizer ring is engaged with one of said pinions and the speeds of said synchronizer ring and said pinions are different, the improvement wherein said gearbox further comprises a plurality of rocking keys bracing said double synchronizer ring, means defining a plurality of axial grooves in said driving collar, each of said grooves receiving and locating one of said locking keys, a plurality of radial thrusters in said grooves and on which said rocking keys are adapted to rock, radially inner and outer faces on each of said rocking keys, first notch means near the middle of said outer face of each rocking key, sloping sides to said first notch for co-operation with said coupling ring, second notch means near the middle of said inner face of each rocking key, and sloping sides to said second notch for co-operation with said thruster whereby when said coupling ring is moved to uncouple it from one of said pinions said rocking keys move to re-center said second notches on said thrusters and thereby disengage said friction surfaces of said synchronizer ring and said pinion.

* * * * *